Jan. 25, 1966 C. W. MILLER 3,231,210
WINDER SHAFT APPARATUS
Filed Feb. 25, 1964 4 Sheets-Sheet 1
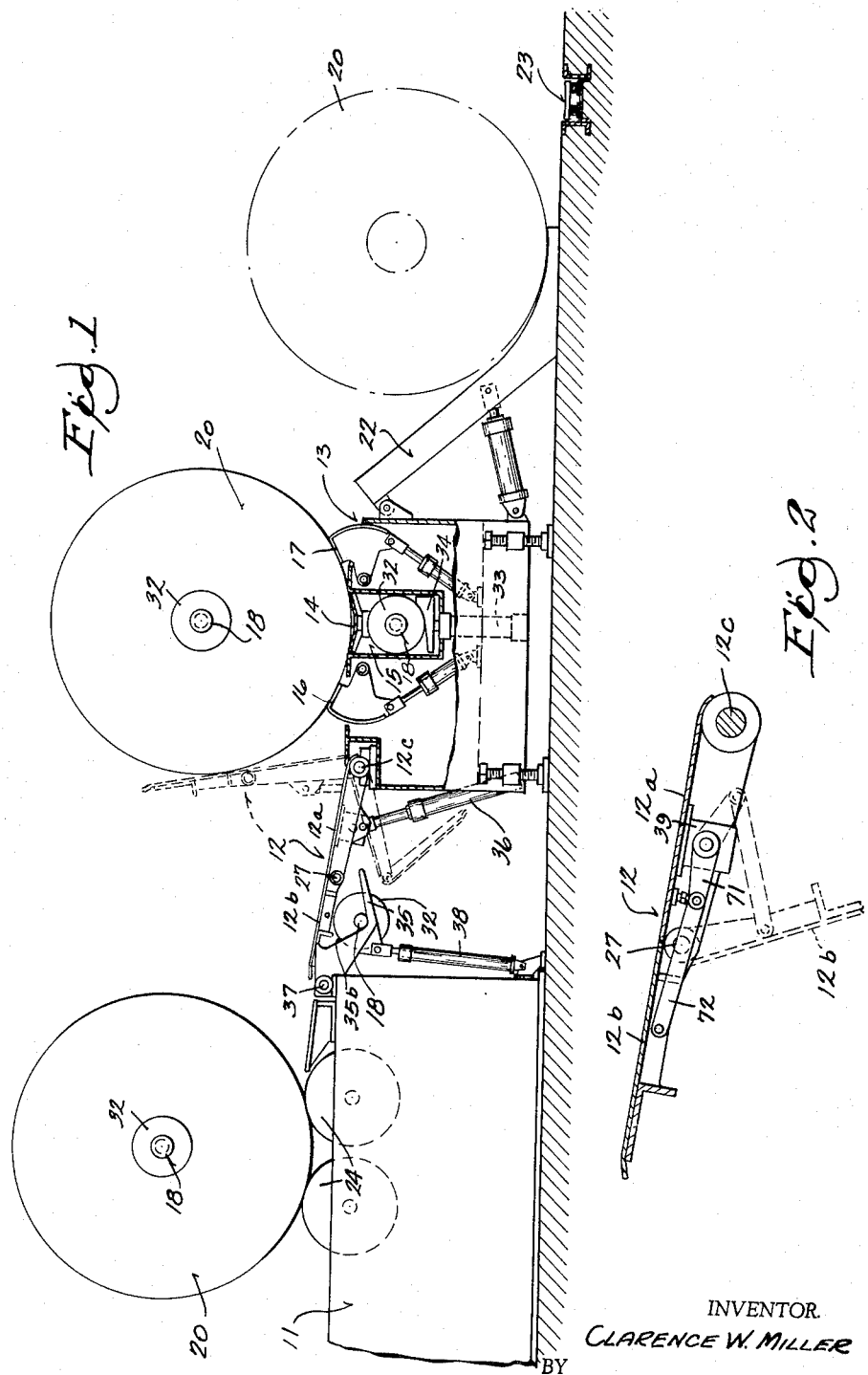
INVENTOR.
CLARENCE W. MILLER
BY Lieben & Niller
ATTORNEYS Jan. 25, 1966  C. W. MILLER  3,231,210
WINDER SHAFT APPARATUS
Filed Feb. 25, 1964  4 Sheets-Sheet 2
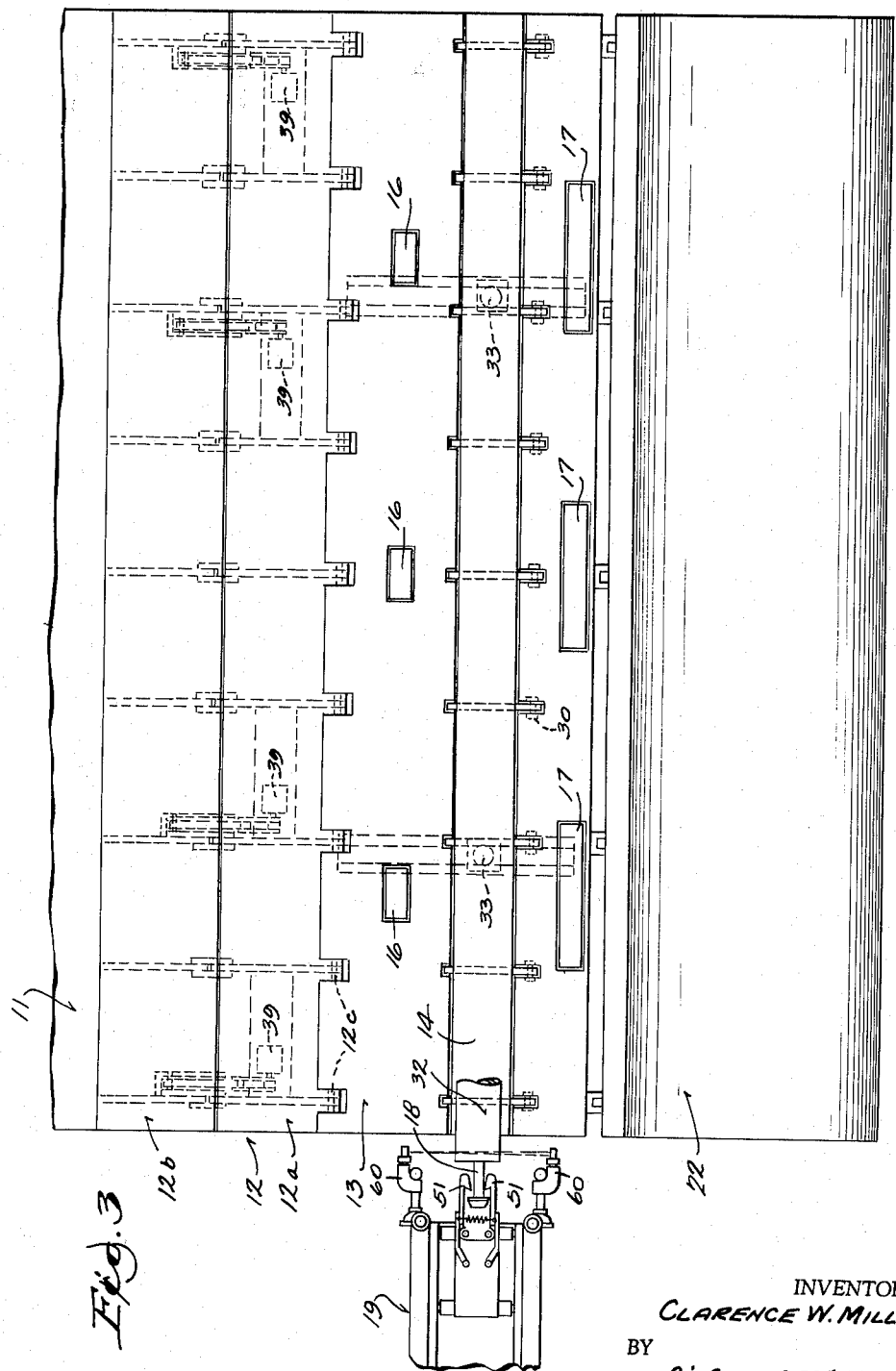
INVENTOR.
CLARENCE W. MILLER
BY
Lieber & Niller
ATTORNEYS Jan. 25, 1966  C. W. MILLER  3,231,210
WINDER SHAFT APPARATUS
Filed Feb. 25, 1964  4 Sheets-Sheet 3
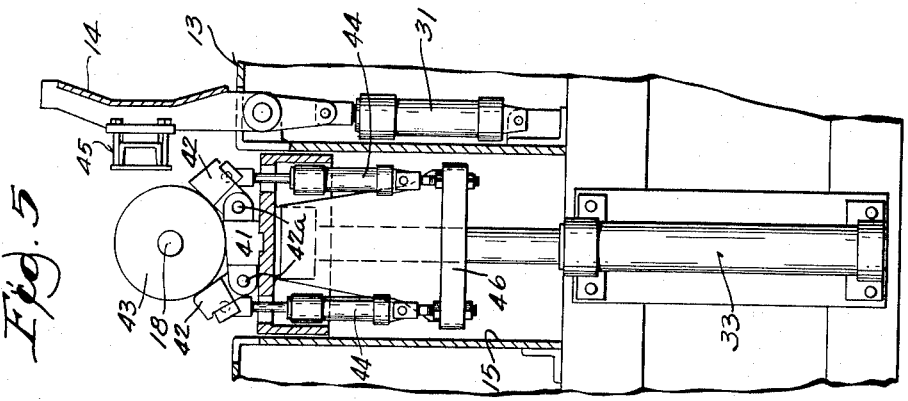
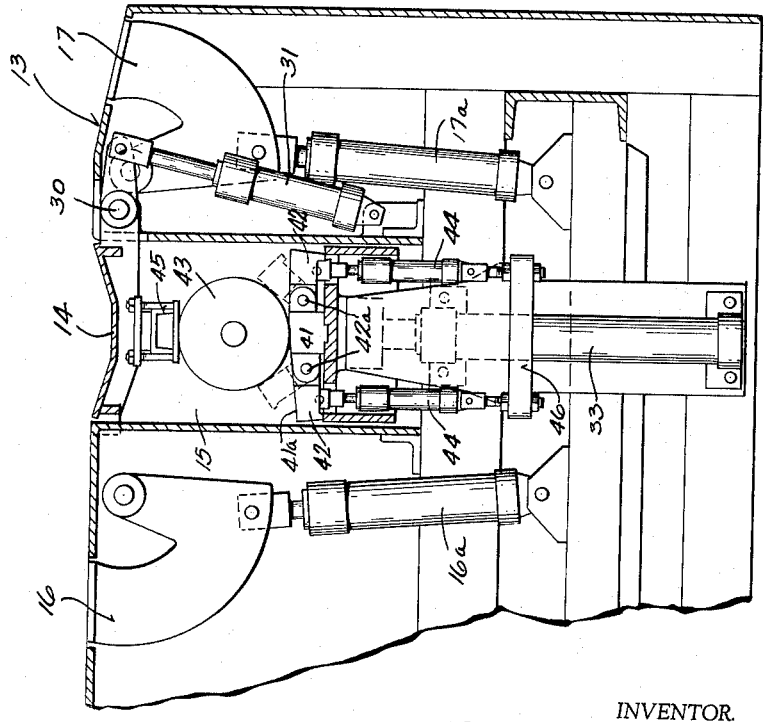
INVENTOR.
CLARENCE W. MILLER
BY
Lieben & Nilles
ATTORNEYS Jan. 25, 1966  C. W. MILLER  3,231,210
WINDER SHAFT APPARATUS
Filed Feb. 25, 1964  4 Sheets-Sheet 4
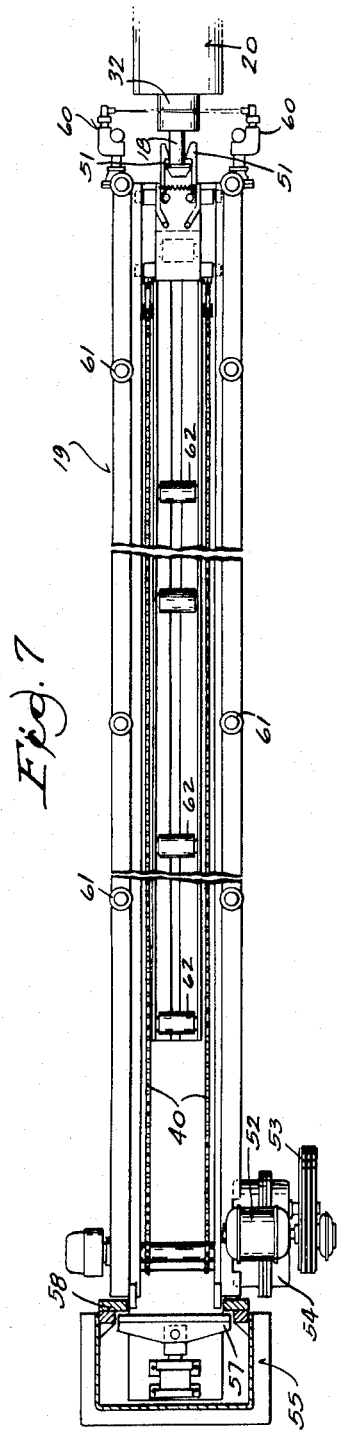
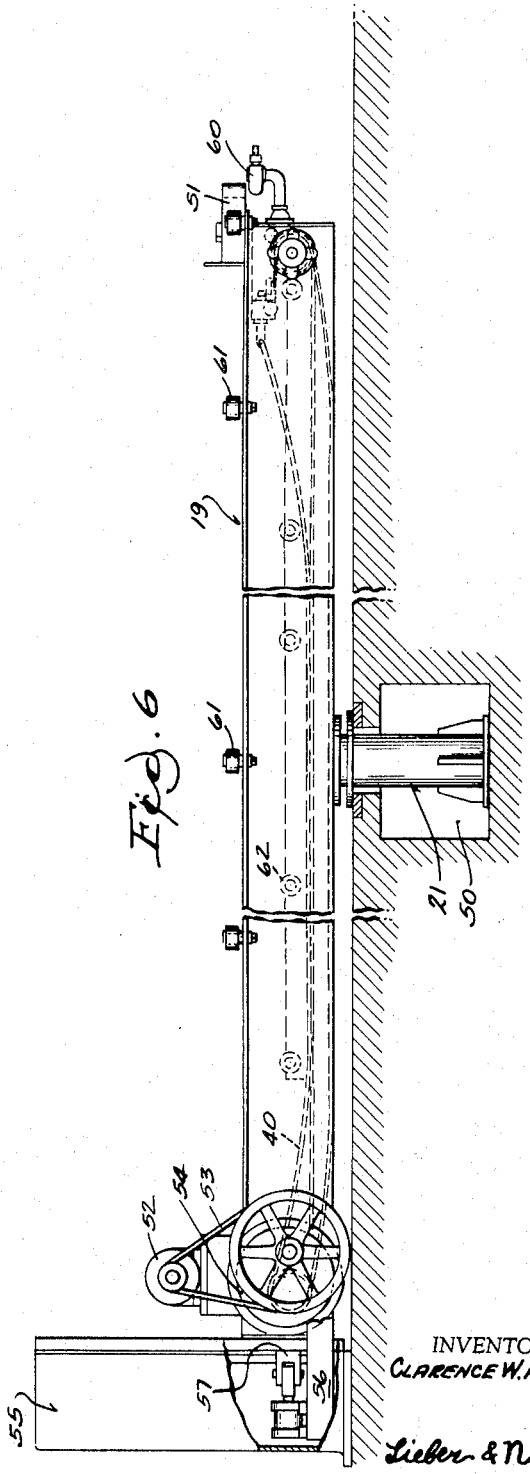
INVENTOR.
CLARENCE W. MILLER
Lieber & Nilles
ATTORNEYS United States Patent Office 3,231,210
Patented Jan. 25, 1966

3,231,210
WINDER SHAFT APPARATUS
Clarence W. Miller, Eland, Wis., assignor to D. J. Murray Manufacturing Co., Wausau, Wis., a corporation of Wisconsin
Filed Feb. 25, 1964, Ser. No. 347,202
7 Claims. (Cl. 242—55)

This invention relates to winder shaft apparatus having novel means for winding and transferring a paper roll together with means for removing and replacing the winder shaft from said paper roll; and relates more particularly to apparatus for transferring and storing shafts and cores from paper rolls and to mechanism for winding of new paper rolls on the transferred shafts and cores.

A primary object of the invention is to provide an improved winder shaft handling apparatus for effectively and efficiently removing, storing and otherwise handling winder shafts and the cores therefor and including means for the removal of the shaft from paper rolls and the initiation of winding of subsequent paper rolls on a replaced shaft.

Various types of roll handling equipment and apparatus for removing a winder shaft upon which the roll is formed have heretofore been proposed. Such prior devices include a roll receiving table as disclosed in United States Patent No. 2,736,507 wherein the table includes a tiltable apron bridging the gap between the winding apparatus and the table, and power means for tilting the apron to move the roll to a position overlying a slot in the table. When the roll is positioned within the table slot, a shaft conveyor is moved to engage one end of the shaft, and the conveyor is energized to pull the shaft from the core. A new roll core or set of cores is then positioned in the roll receiving slot, and the conveyor is re-energized in the opposite direction to insert the shaft within the core. The core is thereafter removed from the table for repositioning in the winding apparatus either by manually rolling the core along the table and apron surface or by energization of power means carried by the table for this purpose.

In the present invention, the complex linkage of prior devices and the actuation thereof have been simplified to effectively and efficiently handle the removal and replacement of shafts in cores of various sizes and to handle the various sized cores beneath a recess cover within a core storage chamber in the table.

It is another object of the invention to provide an improved paper roll and core shaft handling apparatus for operation on a variety of sizes of core shafts.

It is another object of the invention to provide a means for effectively storing and discharging stored core shafts in a storage chamber of said table.

It is still another object of the invention to provide an improved shaft puller device for removing and inserting shafts for paper roll handling and for rewinder operation.

These and other objects and advantages of the invention will become apparent from the following detailed description:

A clear conception of the several features constituting the present invention and of the mode of constructing and operating a winder shaft handling apparatus embodying the improvements may be had by referring to the drawings accompanying and forming a part of this specification, wherein like reference characters designate the same or similar parts in the various views:

FIGURE 1 is an elevational view of the winder apparatus and roll table;

FIGURE 2 is an enlarged fragmentary elevational view of the tiltable bridging member of FIGURE 1;

FIGURE 3 is a plan view of the winder apparatus and roll table of FIGURE 1;

FIGURE 4 is an enlarged elevational view of a modification of the core elevating device of FIGURE 1;

FIGURE 5 is an elevational view similar to that of FIGURE 4 wherein the core and shaft are elevated beyond the table;

FIGURE 6 is an elevational view of the shaft handling apparatus; and

FIGURE 7 is a plan view of the shaft handling apparatus of FIGURE 6.

While the improvements have been illustrated and described as being especially advantageously embodied in a winder shaft handling apparatus, it is not intended to thereby unnecessarily limit or restrict the invention. It is also contemplated that certain descriptive terminology used herein shall be given the broadest possible interpretation consistent with the disclosure.

Referring now to the drawings, FIG. 1 generally illustrates the improved winder shaft apparatus and shaft removal and replacement system which comprises, in general; a web roll winding table 11; a tiltable table 12 having a portion thereof adjoining the table 11; a web roll receiving table 13 provided with a recess cover 14 and a core storage chamber 15 subjacent thereto; a pair of hydraulically actuated stops 16 and 17 for receiving and positioning a web roll 20 longitudinally along recess cover 14 whereby a winder shaft 18 centrally located within the web roll 20 may be removed from the roll 20 by a winder shaft handling device 19 (FIGURE 3) mounted for vertical positioning on a hydraulic operator 21 (FIGURE 6). Also provided is a hydraulically operated tiltable discharge table 22 for facilitating transfer of a completed web roll 20 from which the shaft 18 has been removed to a roll conveyor means 23.

The web roll winding apparatus 11 is of well known construction and operation as described, for example, in my copending application Serial No. 201,444, filed June 11, 1962, now Patent No. 3,131,880. This apparatus is capable of producing and delivering paper rolls of predetermined length and a variety of diameters dependent upon the needs thereof. The rolls 20 when wound to the desired diameter, as by means of powered rollers 24, are discharged toward the tiltable bridging table 12, the surface of which is inclined downwardly (as viewed in the drawings) between table 11 and table 13. The inertia of the roll 20 in travelling down the inclined table 12 by gravity carries the web roll 20 onto table 13 and onto recess cover 14 where the roll is initially stopped by the hydraulically actuated stop 17. Further adjustment of stops 17 and 16 bring the web roll 20 into positive longitudinal alignment along the recess cover 14. When the roll 20 is aligned on the recess cover 14, the shaft 18 can be removed therefrom by the shaft handling device 19 (FIGURE 6), described in greater detail hereinafter.

In the preferred embodiment, recess cover 14 is pivotally attached to table 13 as at pivots 30 (FIGURE 4), and the cover 14 is swingable about said pivots by hydraulic means 31 as shown in FIG. 5 to thereby discharge the roll 20 therefrom. Immediately subjacent recess cover 14 is a core storage chamber 15 adapted to receive and store a core 32 so that a shaft 18 may be inserted therein, the chamber 15 normally having the cover 14 overlying the same but being opened upon swinging of the cover 14 to the position shown in FIG. 5.

After the shaft 18 is removed from the roll 20 by shaft handling device 19, it is lowered, as viewed in the drawing, as it rests on the device 19 by hydraulic operator 21 until the shaft 18 is aligned with the core 32 in the core storage chamber 15. When the shaft 18 is properly aligned, it is inserted in the core 32 by the movement of conveyor 40. Thus the core 32 together with a shaft 18 is ready for transfer to the winding table 11 and rolls 24 so that the winding of the new paper roll 20 may be initiated.

The lower surface of the core chamber 15 is defined by an inclined member 34 attached to a hydraulic jack 33. It should be noted that the member 34 forms an inclined plane directed downwardly (as view in drawings) so that the core with shaft therein moves down the inclined plane of member 34 toward the winding table 11 when the hydraulic jack 33 is actuated to raise the core and shaft adjacent the level of table 13. To raise the core and shaft from the storage chamber 15 the recess cover 14 is pivoted out of the way by the hydraulic means 31. The inclined portion 34 of member 33 in the raised position allows the core and shaft to move downwardly and over the surface of table 13 onto tiltable bridging table 12.

Thus apparatus has been described for winding a paper roll and for transferring the roll to a table 13 for shaft removal from the roll by a shaft handling device. The shaft is then inserted within a core in a core storage chamber in table 13, and the core and inserted shaft are raised to a position relative to table 13 wherein the core and shaft are caused to roll back toward the winding table 11. Further details of the overall structure will now be described.

The bridging table 12 comprises a first plate 12a and a second plate 12b pivotally joined as at pivots 27. The pivots 27 are provided to allow the portion 12b to swing either to a bridging position as shown in FIGURE 1 or to a winder shaft return position as shown in dotted outline. For returning the core and shaft to the winder table 11 a hydraulic operator 36 swings table portion 12a downwardly to an inclined position so that the core and shaft move as by gravity down the inclined plate 12a until the shaft engages and is held by hydraulically actuated arms 35 which are pivotally mounted on table 11 as at pivots 37. The arms 35 thus hold the core and shaft and the hydraulic operator 38 is actuated to carry the core and shaft above the level of table 11 wherein the core and shaft moves as by gravity down inclined portion 35b of arms 35 with sufficient inertia to carry the core and shaft to a winding position relative to rollers 24 wherein the winding of a new paper roll on the core is initiated.

In FIGURE 1 a hydraulic jack 33 actuates an inclined core supporting member 34 so that, in the upward position, the supporting member carries the core and shaft to the level of table 13 where, once clear of the table, the core and shaft roll down the inclined member 34 and over table 13 to the inclined plate 12a of tiltable table 12 as shown in dotted lines.

The hydraulic operator 36 for table 12 causes the table to swing about pivots 12c, and at the same time a motor means 39 is actuated to position linkage 71, 72 to pivot plate 12b about pivots 27 to a position shown in dotted lines in FIGURE 2.

Thus a steeply inclined portion 12a directs the shaft and core toward receiving arms 35, and the arms 35 are positioned by operator 38 to lift the core and shaft above the level of table 11 to direct and cause the shafted core to be positioned on rollers 24 for winding another paper roll 20.

In the modification of FIGURE 4, a core supporting platform 41 is shown being provided with hydraulically actuated fingers 42. The platform 41 has an inclined surface 41a and the platform is adapted to be raised or lowered as by hydraulic jack 33. With the platform 41 in the position shown in FIGURE 4, cores of various diameters may be stored in core chamber 15 for shaft insertion, as described hereinabove. For the small diameter core 43 on the platform 41 of FIGURE 4, the fingers 42 are actuated to the position shown in dotted lines by hydraulic operators 44. Also an attachment 45 is secured to the underside of recess cover 14 to engage the upper surface of the core 43 to grip the core between the attachment 45 and the fingers 42 so that the shaft 18 may be inserted in the core by shaft handling apparatus 19. The fingers 42 are positionable by hydraulic operators 44 attached to platform 41 and mounted on a carrier member 46 that moves with platform 41 when the hydraulic jack 33 is actuated. The fingers are pivoted as at 42a to contact the outer diameter of the core 43 to assist in maintaining the core in position in the core chamber 15 as, for example, during shaft insertion.

When the core 43 has shaft 18 inserted therein the platform 41 can be raised by jack 33, and the recess cover 14 is swung upwardly by hydraulic operator 31. The core 43 with a shaft therein is thus raised to the level of table 13 as shown in FIGURE 5. The fingers 42 are lowered to align with the upper surface of platform 41 to allow the core and shaft to roll down the inclined surface of platform 41 for eventual return to the winder apparatus 11 as hereinabove described in conjunction with tiltable table 12 and hydraulically actuated arms 35.

Thus a modification of a core supporting and raising platform for a table 13 has been described. The attachment 45 to recess cover 14 is removed when it is desired to handle and store larger diameter cores. Further, it is also possible to impart motion to a core when raised to the level of table 13 by lowering one of the fingers 42 and by providing additional actuation of the other finger 42 to start core 43 down the inclined surface of platform 41. Also it is possible to actuate hydraulic operator 31 to cause recess cover 14 and attachment 45 to move against the core to initiate movement of the core 43 down the inclined surface of the platform 41.

After the core with shaft inserted therein has returned to the winder apparatus 11, hydraulic operator 17a can position stop 17 to its stop position as shown in FIGURE 1, and table 13 is then ready to receive another completed paper roll 20 when it arrives at recess cover 14.

The purpose of core storage chamber 15 in both FIGURE 1 and FIGURE 4 is to allow the core therein to be gripped and held during the insertion of the shaft 18 into the core. The hydraulic jack 33 is actuated to urge the core against the recess cover 14 or any attachments thereto. In FIGURE 4, actuatable fingers 42 are provided for use when smaller cores are being handled. However, with each platform 34 and 41, an inclined surface is provided so that the core will roll toward the winder apparatus 11 by reason of the incline. In the modification of FIGURES 4 and 5, the platform could be substantially level at the upper surface thereof, and the initiation of core movement toward winder apparatus 11 could be by actuation of fingers 42 or by recess cover 14 as hereinabove described.

For removing shaft 18 from the paper roll 20, a shaft handling apparatus 19 is shown in FIGURES 6 and 7. While this shaft handling apparatus 19 is shown in one preferred embodiment, other apparatus may be used for removing the shaft and reinserting the shaft in another core. For example, see copending patent application No. 201,444 referred to hereinabove. However, expeditious shaft handling is facilitated by withdrawing the shaft onto a powered conveyor and then actuating the shaft handling apparatus to vertically position the same so that the shaft is longitudinally aligned with the core in the core storage chamber for shaft insertion therein.

Specifically, in FIGURES 6 and 7, the shaft handling apparatus 19 is mounted for positioning in a vertical plane by a hydraulic means 21, shown mounted below the level of the floor in a recess 50. The apparatus 19 is longitudinally aligned with recess cover 14 and core storage chamber 15 (see FIGURE 3). Mounted on one end of apparatus 19, remote from the shaft gripping jaws 51, is a motor means 52 for powering a shaft conveyor 40 through a belt drive 53 and gear means 54. As thrust is exerted when the gripping jaws 51 are actuated to withdraw or insert a shaft, a vertically extending thrust member 55 is mounted on the floor. A portion of the frame 56 of apparatus 19 extends within member 55. A slide means 57 is provided on frame 56 to slideably guide and resist the thrust of apparatus 19 along channels 58, thus relieving the hydraulic means 21 of any significant thrust loads that would interfere with the hydraulic actuation of means 21.

For removing the shaft 18 from paper roll 20, the shaft handling apparatus 19 is moved upwardly by hydraulic operator 21 until the shaft gripping jaws 51 are aligned with shaft 18 to grip the end of the shaft 18. A photoelectric means 60 may be provided to assist in the precise positioning of the jaws 51 relative to the shaft end. The conveyor 40 is then powered by motor means 52 to withdraw the jaws and shaft 18 from the paper roll 20. As the shaft 18 is pulled from the paper roll, it is guided between guide rollers 61, and is supported on conveyor 40 by rollers 62 spaced along the longitudinal extent of the shaft handling apparatus 19.

When the shaft 18 has been fully withdrawn from the paper roll 20 and is supported entirely on apparatus 19, the hydraulic operator 21 is lowered until the shaft 18 is in alignment with the shaft opening in a core positioned in the core chamber 15. The conveyor 40 is then powered to move the shaft 18 into the core. The core is held stationary in the core chamber 15 as hereinabove described to facilitate the insertion of the shaft within the core.

The actuation of the jaws 51 is described in detail in copending patent application Serial No. 201,444 referred to hereinabove and forms no part of this invention.

After the shaft has been inserted in the core in the storage chamber 15, the apparatus may be positioned vertically upwardly to a position in alignment with the recess cover 14 and ready to be quickly moved to grasp the next shaft of the next paper roll delivered to recess cover 14.

Thus winding apparatus has been described which provides for the handling and removal of completed paper rolls, and the removal of a shaft from said paper roll; and which further provides for the insertion of a shaft in a core as stored in a core storage chamber. The core with an inserted shaft is moreover readily and effectively returned to the winder apparatus in a facile manner by the apparatus described herein to initiate the winding of a new paper roll on the core and shaft.

Various modes of carrying out the invention are contemplated as being within the scope of the following claims particularly pointing out and distinctly claiming the subject matter which is regarded as the invention:

I claim:

1. A roll winding and handling apparatus comprising, a table having a core storage chamber therein, a cover pivotally secured to said table and normally overlying said chamber, said cover being recessed to initially receive and position a roll having an axial shaft therethrough on said table above said chamber, means on said table extensible from a position flush with said table to a position whereby the roll is engaged on opposite sides of said cover for preventing displacement thereof from its initial position, shaft transfer means axially alignable with said roll for removing said shaft longitudinally therefrom, said shaft transfer means also being laterally shiftable into axial alignment with a core stored in said chamber for insertion of said shaft within said core, power means for swinging said cover about its pivot to discharge the roll therefrom and to uncover said core storage chamber, and power means for raising the core in said chamber and for discharging the same therefrom while said cover is swung to open position.

2. A roll winding and handling apparatus according to claim 1, wherein the means cooperable with the roll for preventing displacement thereof includes at least one pivotally mounted member on each side of the cover and extensible power means for swinging said members from their normal positions flush with said table to their effective positions whereby they engage the roll.

3. A roll winding and handling apparatus comprising, a table having a core storage chamber therein, a cover pivotally secured to said table and normally overlying said chamber, said cover being recessed to initially receive and position a roll having an axial shaft therethrough on said table above said chamber, means on said table extensible from a normal position flush with said table to a position whereby the roll is engaged on opposite sides of said cover for preventing displacement thereof from its initial position, shaft transfer means axially alignable with said roll for removing said shaft longitudinally therefrom while said roll is engaged by said displacement preventing means, said shaft transfer means also being laterally shiftable into axial alignment with a core stored in said chamber for insertion of said shaft within said core, power means operable with said displacement preventing means in normal position for swinging said cover about its pivot to discharge the roll from one side thereof and to simultaneously uncover said core storage chamber, and means including a power actuator and an inclined support for raising the core in said chamber and for discharging the same from the other side thereof while said cover is swung to open position.

4. A roll winding and handling apparatus according to claim 3, wherein means are also provided for receiving the discharged core and for transferring the same to a roll winding device.

5. A roll winding and handling apparatus comprising, a table having a core storage chamber therein, a cover pivotally secured to said table and normally overlying said chamber, said cover being recessed to initially receive and position a roll having an axial shaft therethrough on said table above said chamber, shaft transfer means axially alignable with said roll for removing said shaft longitudinally therefrom, said shaft transfer means also being laterally shiftable into axial alignment with a core stored in said chamber for insertion of said shaft within said core, power means for swinging said cover about its pivot to discharge the roll from one side thereof and to simultaneously uncover said core storage chamber, means including a power actuator and a cam surface for raising the core in said chamber and for discharging the same from the other side thereof while said cover is swung to open position, a roll winding device spaced laterally of said table, a support pivotally secured to the table and extending laterally therefrom toward said roll winding device, and power means for swinging said support about its pivot to and from an outwardly and downwardly inclined core transfer position.

6. A roll winding and handling apparatus according to claim 5, additionally including a pair of spaced apart shaft receiving fingers pivotally mounted on the roll winding device, and means for swinging said fingers from a position wherein they receive the core from the inclined support to a position whereby the core is transferred to the winding device.

7. A roll winding and handling apparatus according to claim 5, wherein the pivotal support is also swingable by its power means to an outwardly and upwardly inclined position whereby a completed roll may be transferred from the winding device to the table.

References Cited by the Examiner

UNITED STATES PATENTS

| | | | |
|---|---|---|---|
| 1,979,310 | 11/1934 | Berry | 242—81 |
| 2,736,507 | 2/1956 | Neese et al. | 242—55 |
| 2,772,838 | 12/1956 | Lenz | 242—55 |
| 3,066,883 | 12/1962 | Egan | 242—66 X |
| 3,131,880 | 5/1964 | Miller et al. | 242—55 |

MERVIN STEIN, *Primary Examiner.*